US012632861B2

(12) United States Patent
Speed et al.

(10) Patent No.: US 12,632,861 B2
(45) Date of Patent: May 19, 2026

(54) COMPUTER-BASED SYSTEMS CONFIGURED TO AUTOMATICALLY PROGRAM A PLURALITY OF CONTROLS TO MODIFY A COMMUNICATION SESSION ASSOCIATED WITH A TRANSACTION AND METHODS OF USE THEREOF

(71) Applicant: Broadridge Financial Solutions, Inc., Newark, NJ (US)

(72) Inventors: Michael Speed, Newark, NJ (US); Tim Profitt, Newark, NJ (US); Julie Hodum, Newark, NJ (US); Angelo Riccio, Newark, NJ (US); RajSekhar Reddygari, Newark, NJ (US); Krishna Hegde, Newark, NJ (US); Michael Stallmeyer, Newark, NJ (US); Pat Scaglione, Newark, NJ (US); Terry Ashby, Newark, NJ (US); Herbert Heilmann, Newark, NJ (US); Jeffrey Klein, Newark, NJ (US); Mitchell Herman, Newark, NJ (US); Michael Ward, Newark, NJ (US)

(73) Assignee: Broadridge Financial Solutions, Inc., Newark, NJ (US)

( * ) Notice: Subject to any disclaimer, the term of this patent is extended or adjusted under 35 U.S.C. 154(b) by 0 days.

(21) Appl. No.: 18/627,101

(22) Filed: Apr. 4, 2024

(65) Prior Publication Data
US 2024/0338696 A1 Oct. 10, 2024

Related U.S. Application Data

(60) Provisional application No. 63/494,199, filed on Apr. 4, 2023, provisional application No. 63/494,188, filed on Apr. 4, 2023.

(51) Int. Cl.
*G06Q 20/40* (2012.01)
*G06Q 40/04* (2012.01)

(52) U.S. Cl.
CPC ......... *G06Q 20/401* (2013.01); *G06Q 20/405* (2013.01); *G06Q 40/04* (2013.01)

(58) Field of Classification Search
None
See application file for complete search history.

(56) References Cited

U.S. PATENT DOCUMENTS 11,921,692 B1 * 3/2024 Kousha ................ H04M 1/575
2014/0026179 A1 1/2014 Devarajan et al.
(Continued)

OTHER PUBLICATIONS

International Search Report and Written Opinion from International Application No. PCT/US2024/023097 dated Jul. 16, 2024.

*Primary Examiner* — Matthew S Gart
*Assistant Examiner* — Liz P Nguyen
(74) *Attorney, Agent, or Firm* — GREENBERG TRAURIG, LLP

(57) ABSTRACT

In some embodiments, the present disclosure provides an exemplary method that may include steps of accessing a set of data records; receiving an instruction to perform an action; determining input data associated with the instruction; verifying the input data; identifying a pattern of behavior associated with each type of data; converting verified input data of a particular data type into a uniform secure data state; dynamically enabling a communication session between at least two security modules; orchestrating a delay within the communication session; and automatically programming a plurality of controls to modify the communication session.

20 Claims, 7 Drawing Sheets

(56) References Cited

U.S. PATENT DOCUMENTS

| | | | |
|---|---|---|---|
| 2014/0250491 A1 | 9/2014 | Fleischman et al. | |
| 2017/0374076 A1 | 12/2017 | Pierson et al. | |
| 2018/0027006 A1 | 1/2018 | Zimmermann et al. | |
| 2018/0191759 A1 | 7/2018 | Baijal et al. | |
| 2023/0088436 A1* | 3/2023 | Kramme | G06Q 20/24 |
| | | | 705/44 |
| 2023/0289325 A1* | 9/2023 | Kurian | G06F 16/1748 |
| 2023/0351435 A1* | 11/2023 | Wright | G06N 3/088 |

* cited by examiner

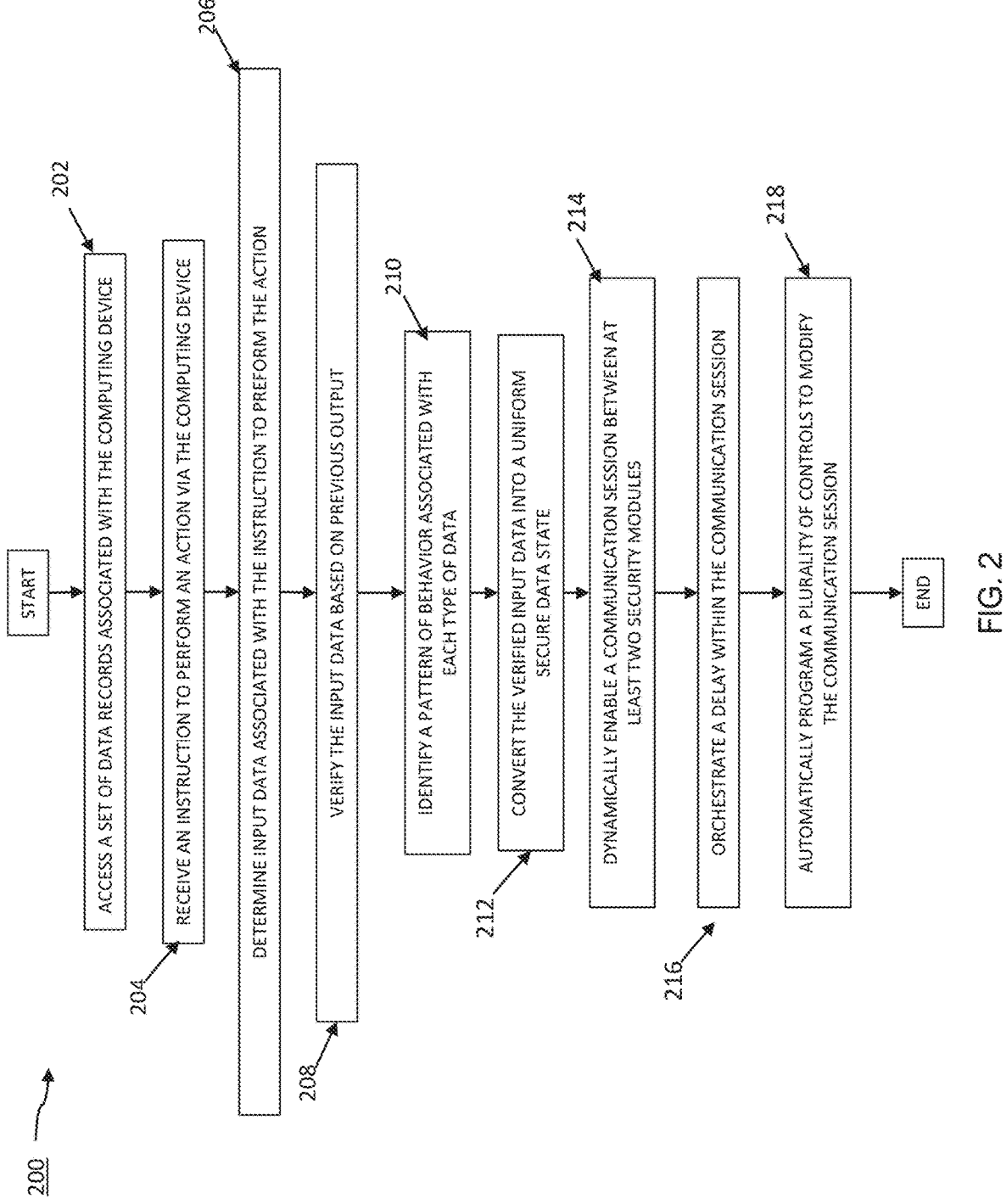

200

START

ACCESS A SET OF DATA RECORDS ASSOCIATED WITH THE COMPUTING DEVICE — 202

RECEIVE AN INSTRUCTION TO PERFORM AN ACTION VIA THE COMPUTING DEVICE — 204

DETERMINE INPUT DATA ASSOCIATED WITH THE INSTRUCTION TO PREFORM THE ACTION — 206

VERIFY THE INPUT DATA BASED ON PREVIOUS OUTPUT — 208

IDENTIFY A PATTERN OF BEHAVIOR ASSOCIATED WITH EACH TYPE OF DATA — 210

CONVERT THE VERIFIED INPUT DATA INTO A UNIFORM SECURE DATA STATE — 212

DYNAMICALLY ENABLE A COMMUNICATION SESSION BETWEEN AT LEAST TWO SECURITY MODULES — 214

ORCHESTRATE A DELAY WITHIN THE COMMUNICATION SESSION — 216

AUTOMATICALLY PROGRAM A PLURALITY OF CONTROLS TO MODIFY THE COMMUNICATION SESSION — 218

END

FIG. 2

COMPUTER-BASED SYSTEMS CONFIGURED TO AUTOMATICALLY PROGRAM A PLURALITY OF CONTROLS TO MODIFY A COMMUNICATION SESSION ASSOCIATED WITH A TRANSACTION AND METHODS OF USE THEREOF

RELATED APPLICATIONS

This application claims the benefit of U.S. Application No. 63/494,188 entitled Computer-based Systems Configured to Dynamically Retrieve a Plurality of Data Points from Disparate Data Sources and Methods of Use Thereof and filed on Apr. 4, 2023 and U.S. Application No. 63/494,199 entitled Computer-based Systems Configured to Modify Data to Perform at Least One Function and Methods of Use Thereof and filed on Apr. 4, 2023; which are hereby incorporated by reference in their entirety.

FIELD OF TECHNOLOGY

The present disclosure generally relates to computer-based systems configured to automatically program a plurality of controls to modify a communication session associated with a transaction and methods of use thereof.

BACKGROUND OF TECHNOLOGY

Typically, a currency exchange is a licensed business that allows customers to exchange one currency for another. Currency exchange of physical money (coins and paper bills) is usually done over the counter at a teller station, which can be found in various places. There are four main types of an exchange rate regime, such as freely floating, fixed, pegged, and managed float, but each maintain a similar formula for the conversion of a first currency to a value of a second currency.

SUMMARY OF DESCRIBED SUBJECT MATTER

In some embodiments, the present disclosure provides an exemplary technically improved computer-based method that includes at least the following steps: accessing, by at least one processor, a set of data records associated with a computing device; receiving, by the at least one processor, an instruction to perform an action via the computing device; utilizing, by the at least one processor, a processing module to determine input data associated with the instructions to perform the action, where the processing module includes determining a plurality of types of data and respective values in real-time for each type of data; verifying, by the at least one processor, the input data based on the previous output; identifying, by the at least one processor and in response to verifying the input data, a pattern of behavior associated with each type of data over a predetermined period of time; converting, by the at least one processor, verified input data of a particular data type into a uniform secure data state based on an established baseline associated with the pattern of behavior; dynamically enabling, by the at least one processor, a communication session between at least two security modules of a plurality of security modules associated with a plurality of entities based on a dynamic bus architecture associated with each security module, where a first security module transmits a data packet associated with the uniform secure data state to a second security module, orchestrating, by the at least one processor, a delay within the communication session based on a plurality of thresholds associated with the wherein the data object comprises a currency data object associated with a particular data type with a respective value at the predetermined period of time; automatically programming, by the at least one processor, a plurality of controls to modify the communication session based on the delay in relation to a predetermine threshold, where the plurality of controls include at least one control associated with a time of the type of data and at least one control associated with a value of the type of data, where the predetermined threshold is based on the respective type and value of data associated with the input data.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIG. 2 is a flowchart illustrating operational steps for automatically programming a plurality of controls to modify a communication session, in accordance with one or more embodiments of the present disclosure.

DETAILED DESCRIPTION

Figure 1:
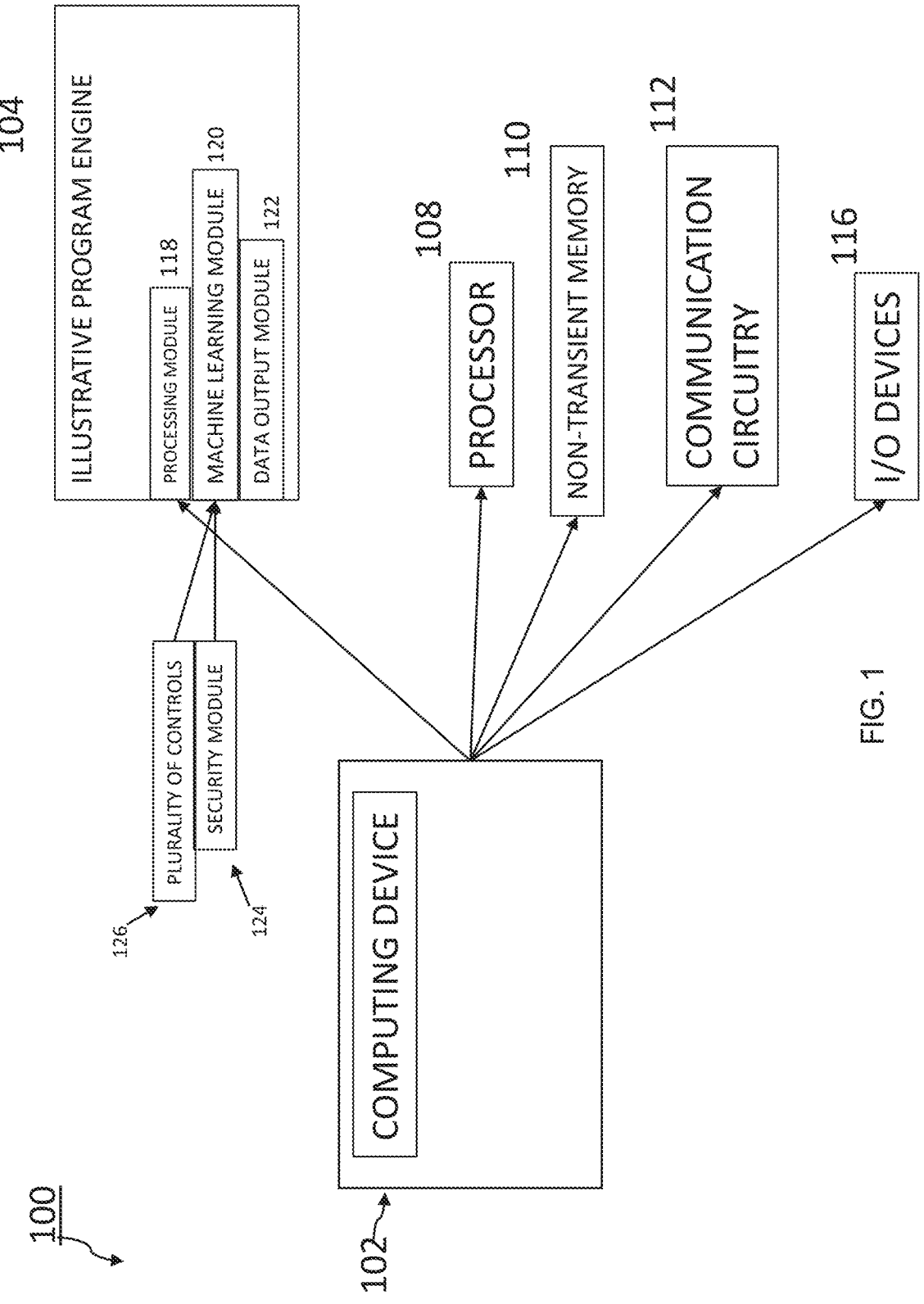
FIG. 1 depicts a block diagram of an exemplary computer-based system and platform for automatically programming a plurality of controls to modify a communication session, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a creator interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Each and every principle, methodology and/or system arrangement detailed herein may be utilized with one or more principles, methodology(ies) and/or system arrangement(s) detailed in one or more of: U.S. Pat. Nos. 8,370,244; 8,271,261; 8,103,564; 8,200,567; 8,214,279; 8,793,182; 8,396,785; 8,788,318; 8,521,632; 8,606,669; 9,009,062; 9,507,667; 10,497,062; 8,930,482; 9,319,368; 8,856,046; 9,183,531; 9,195,957; 9,967,238; 10,333,910; 9,967,238; 10,979,405; 10,556,254; 10,133,970; 10,460,218; 10,832, 105; 10,554,699; 10,825,093; 11,030,695 or any combination thereof.

At least some embodiments of the present disclosure provide technological solution(s) to at least one technological computer-centered problem associated with determining a current currency value in relation to other currencies in real-time. An illustrative technological computer-centered problem associated with optimal timing of triggering instructions to external systems, where the instructions are typically triggered immediately upon request. Such on-request triggering fails to account for variable conditions that may result in instruction being delivered before or after circumstances change, contrary to the objective of the request. For example, a request for a currency conversion would ordinarily being executed immediately upon request, without taking into account short-term variability in relative values of the currencies being exchanged. The illustrative technological computer-centered problem increases a likelihood that the individual loses value as the exchanged currency is a different value of the original currency. As detailed in at least some embodiments herein, at least one technological computer-centered solution associated with the illustrative technological computer-centered problem may include utilizing a processing module with customized timing and delay functionality to enable a communication session between a separate systems to trigger instructions at an optimal time such that a delay is orchestrated based on a plurality of thresholds associated with a value and a type of data, and automatically programming a plurality of controls to modify the communication session to ensure instructions are sent and/or received at an optimal time for exchanging the data when the values are within the thresholds. In some embodiments, the present disclosure may access a set of data records associated with a computing device. In some embodiments, the present disclosure may receive an instruction to perform an action via the computing device and then utilize a processing module to determine input data associated with the instructions to perform the actions.

FIG. 1 depicts a block diagram of an exemplary computer-based system and platform automatically programming a plurality of controls to modify a communication session, in accordance with one or more embodiments of the present disclosure.

In some embodiments, an illustrative computing system 100 of the present disclosure may include a computing device 102 associated with at least one user and an illustrative program engine 104. In some embodiments, the illustrative program engine 104 may be stored on the computing device 102. In some embodiments, the illustrative program engine 104 may be stored on the computing device 102, which may include a processor 108, a non-transitory memory 110, a communication circuitry 112 for communicating over a communication network 114 (not shown), and input and/or output (I/O) devices 116 such as a keyboard, mouse, a touchscreen, and/or a display, for example. In some embodiments, the computing device 102 may refer to at least one communication-enabled computing device of a plurality of communication-enabled computing devices.

In some embodiments, the illustrative program engine 104 may be configured to instruct the processor 108 to execute one or more software modules such as, without limitation, an exemplary processing module 118, a machine-learning module 120, and/or a data output module 122.

In some embodiments, an exemplary processing module 118 of the present disclosure, utilizes a least one machine learning algorithm, described herein, to determine input data associated with the instruction to perform the action by simultaneously determining a plurality of types of data and a plurality of respective values for each type of data in real-time. In certain embodiments, the types of data may refer to a plurality of currencies identified around the world and the respective value is the current value of that currency in relation to, e.g., the U.S. Dollar or other currency, such as the Euro, Canadian Dollar, Australian Dollar, U.K. Pound, Japanese Yen, etc. In some embodiments, the exemplary processing module 118 may verify the input data based on previous output. In certain embodiments, the previous output may refer to a previous currency exchange between at least two currencies. The processing module 118 may verify the input data by comparing the previous output to the determined input data. In some embodiments, the exemplary processing module 118 may identify a pattern of behavior associated with each type of data over a predetermined period of time. In certain embodiments, the processing module 118 may utilize a trained machine learning module to establish a pattern and/or baseline associated with a value or quantity associated with the data type particular to the verified input data. In some embodiments, the exemplary processing module 118 may convert the verified input data into a uniform secure data state based on the established baseline. The uniform secure data state may refer to a digital representation of the verified input data with a particular insight on the type of data and the respective value of data in real-time. In certain embodiments, the particular insight may refer to additional detail used to represent the input data in a digital medium such as an additional salt value associated with a hashing value for each type of data. In some embodiments, the exemplary processing module 118 may enable a communication session between a plurality of security modules associated with a plurality of entities. In certain embodiments, the plurality of entities may refer to at least one globally-recognized currency exchanged on the foreign exchange market and/or a treasury that orchestrates and regulates the globally-recognized currency. The plurality of security modules may maintain a dynamic bus architecture that allows a first security module to transmit and receive a data packet to and from a second security module. In some embodiments, the exemplary processing module 118 may orchestrate a delay within the communication session based on a plurality of thresholds. The plurality of thresholds may refer to at least one threshold associated with a particular type with a respective value. In some embodiments, the exemplary processing module 118 may automatically program a plurality of controls to modify the communication session based on the delay. The plurality of controls may include at least one control programmed to trigger an action when the threshold of the particular type is met and at least one control programmed to trigger an action when threshold of the particular value is met.

In certain embodiments, the exemplary processing module 118 may generate a notification detailing the conversion displayed via a graphic user interface housed in the computing device 102. In some embodiments, the exemplary processing module 118 may utilize an operations console to instruct subsequent transactions based on the conversion of the verified input data. In some embodiments, the exemplary processing module 118 may utilize a rules engine to collect market input to modify the converted input data to match market output data based on the established baseline and generate a printed notification further detailing the modified input data based on the market output data.

In some embodiments, the present disclosure describes systems for automatically utilizing at least one trained machine learning algorithm of a plurality of machine learning algorithms within the machine learning module 120 that may determine the input data associated with instructions to perform the action, where the action may refer to an initiation of an exchange of the input data into a particular data packet. In some embodiments, the machine learning module 120 may verify the input data based on a result of a previous machine learning module 120. In some embodiments, the machine learning module 120 may identify a pattern of behavior associated with each type of data over a predetermined period of time. In certain embodiments, the pattern of behavior may refer to a fluctuation of value associated with a particular type of currency over a monitored period of time. In some embodiments, the machine learning module 120 may be trained to predict changes to the value of the particular type of currency to dynamically determine the pattern of behavior associated with each type of data.

In some embodiments, the machine learning module 120 may convert verified input data into a uniform secure data state. The uniform secure data state may refer to a conversion of a physical asset to a digital asset that maintains a unique salt value for the particular type of data and a uniform hashing value for the plurality of types of data capable of being exchanged. In certain embodiments, the conversion may refer to a particular type of data that is connective to each type of data, thus a uniform data state. For example, the uniform secure data state may refer to a digital token to represent the type of data and current value in real-time. In some embodiments, the machine learning module 120 may convert verified input data into a uniform secure data state based on an established baseline associated with the pattern of behavior in response to verifying the input data. The established baseline may refer to the predicted fluctuation of value associated with each type of data over the predetermined period of time.

In some embodiments, the machine learning module 120 may dynamically enable a communication session between at least two security modules 124 of a plurality of security modules 124 associated with a plurality of entities based on a dynamic bus architecture associated with each security module. In certain embodiments, the machine learning module 120 may enable a first security module to transmit a data packet associated with the uniform secure data state to a second security module and allows the second security module to receive and manipulate the data packet from the first security module. In some embodiments, the machine learning module 120 may orchestrate a delay within the communication session based on a plurality of thresholds. The delay may refer to a pause of transmission of the data packet between the two security modules for the purpose of capitalizing on the pattern of behavior of the particular type of data. The plurality of thresholds may refer to at least one threshold associated with the value of data and at least one threshold associated with the type of data, where together these thresholds provide an ideal time to allow the transfer of the data packet as the particular data type is at a value that exceeds the verified input data. In certain embodiments, the threshold of type of data may refer to a user preference associated on a list of currencies the user is willing to exchange with, such as only the Japanese Yen. In other embodiments, the threshold of value may refer the predicted value of the trained machine learning module 120 with a minimum range that exceeds five percent of the established baseline and a maximum range that exceeds 100 percent of the established baseline of the particular type of currency. In some embodiments, the machine learning module 120 may automatically program a plurality of controls 126 to modify the communication session based on the delay.

In some embodiments, the data output module 122 may retrieve the set of data records from a previous transaction as output of the trained machine learning module 120 and the exemplary processing module 118. In some embodiments, the data output module 122 may determine the input data associated with at least one instruction to perform the action. In some embodiments, the data output module 122 may determine a plurality of types of data and respective values in real-time for each type of data. In some embodiments, the data output module 122 may generate a verification of the input data based on previous output of the exemplary processing module 118. In some embodiments, the data output module 122 may generate a pattern of behavior associated with each type of data based on an output of the trained machine learning module 120. In some embodiments, the data output module 122 may convert the verified input data of a particular data type into a uniform secure date state based on the established baseline. In some embodiments, the data output module 122 may generate instructions to enable a communication session between at least two security modules 124, where the instructions may instruct the transmission of a data packet between the at least two security modules 124. In some embodiments, the data output module 122 may orchestrate a delay within the communication session based on a plurality of thresholds. In some embodiments, the data output module 122 may program a plurality of controls 126 to modify the communication session based on the delay.

In some embodiments, the illustrative program engine 104 may access a set of data records associated with the computing device 102. In some embodiments, the illustrative program engine 104 may receive an instruction to perform an action via the computing device 102. In some embodiments, the illustrative program engine 104 may utilize the processing module 118 to determine input data associated with the instructions to perform the action. In some embodiments, the illustrative program engine 104 may verify the input data based on a previous output of the processing module 118. In some embodiments, the illustrative program engine 104 may convert the verified input data of a particular data type into a uniform secure data state based on the established baseline. In some embodiments, the illustrative program engine 104 may dynamically enable a communication session between at least two security modules 124 of a plurality of security modules 124 associated with a plurality of entities associated with each security module 124, where this bus architecture allows the security modules to communicate without the need for human intervention. In some embodiments, the illustrative program engine 104 may automatically programming a plurality of controls 126 to modify the communication session based on the delay in relation to a predetermined threshold. In some embodiments, the illustrative program engine 104 may generate notification detailing a conversion to the uniform secure data state to be displayed via a GUI housed on the computing device 102. In some embodiments, the illustrative program engine 104 may utilize the operations console device to instruct subsequent transactions based on the conversion of the verified input data. In some embodiments, the illustrative program engine 104 may receive a second instruction via the computing device 102. In some embodiments, the illustrative program engine 104 may utilize a rules engine to collect market input to modify the converted input data to match market output data based on the established baseline associated with the output of the previous transaction. In this embodiment, the collected market input of a plurality of previous transactions associated with each type of data constructs the established baseline with the assistance of the trained machine learning module 120, is subsequently used to match the collected market input to the market output data in order to preform an action when the threshold of value exceeds the collected market input. In some embodiments, the illustrative program engine 104 may generate a printed notification detailing modified input data based on the market output data.

In some embodiments, the non-transient memory 110 may store the set of data records associated with the computing device 102. In some embodiments, the non-transient memory 110 may store instructions to perform actions via the computing device 102. In some embodiments, the non-transient memory 110 may store the pattern of behavior associated with each type of data over the predetermined period of time. In some embodiments, the non-transient memory 110 may store the plurality of thresholds associated with the trained machine learning module 120. In some embodiments, the non-transient memory 110 may store the instructions to enable the communication session between the at least two security modules 124. In some embodiments, the non-transient memory 110 may store a plurality of instructions associated with programming a plurality of controls to modify the communication session. In some embodiments, the non-transient memory 110 may store notifications detailing the conversion.

FIG. 2 is a flowchart 200 illustrating operational steps for automatically programming a plurality of controls to modify a communication session, in accordance with one or more embodiments of the present disclosure.

In step 202, the illustrative program engine 104 of the computing device 102 accesses a set of data records associated with the computing device 102. In some embodiments, the illustrative program engine 104 may access a set of data records as output of a previous transaction associated with the computing device 102 of a particular user. The set of data records may refer to data points associated with the previous transaction. In some embodiments, the illustrative program engine 104 may utilize the processing module 118 to access the set of data records associated with the computing device 102.

In step 204, the illustrative program engine 104 receives an instruction to perform an action via the computing device 102. In some embodiments, the illustrative program engine 104 may receive the instruction to perform the action via the computing device 102. In certain embodiments, the action may refer to a transfer of currencies from one entity to another entity, a purchase, a sell, a transaction associated with the data, and an exchange of currency from a first type of currency to a second type of currency. In some embodiments, the exemplary processing module 118 may receive the instruction to perform the action via the computing device 102.

In step 206, the illustrative program engine 104 determines input data associated with the instruction to perform the action. In some embodiments, the illustrative program engine 104 may determine the input data associated with the instruction to perform the action via the computing device 102. The input data may refer to a particular type of data the user is seeking to exchange. In certain embodiments, the input data may refer to the previous transaction compared to collected market data associated with the particular type of data. In some embodiments, the illustrative program engine 104 may utilize the exemplary processing module 118 to determine the input data associated with the instruction to perform the action. In certain embodiments, the processing module 118 may determine a plurality of types of data and respective values in real-time for each type of data of the plurality of types of data.

In step 208, the illustrative program engine 104 verifies the input data based on previous output. In some embodiments, the illustrative program engine 104 verifies the input data by utilizing a trained machine learning module 120 to compare the input data associated with the instruction to perform the action to the output of previous transactions. In some embodiments, the illustrative program engine 104 may utilize the exemplary processing module 118 to verify the input data based on previous output.

In step 210, the illustrative program engine 104 identifies a pattern of behavior associated with each type of data. In some embodiments, the illustrative program engine 104 may identify the pattern of behavior associated with each type of data over a predetermined period of time. In some embodiments, the identify the pattern of behavior associated with each type of data over a predetermined period of time in response to verifying the input data. In certain embodiments, the illustrative program engine 104 may utilize the trained machine learning module 120 to establish a baseline associated with each type of data based on the respective real-time value; identify a pattern of behavior based on that established baseline for each type of data; and dynamically predict a future value for each type of data based on the identified pattern of behavior. In some embodiments, the exemplary processing module 118 may utilize trained machine learning module 120 to identify the pattern of behavior associated with each type of data over the predetermined period of time. In certain embodiments, the predetermined period of time may refer to a time period for the trained machine learning module 120 to monitor any activity associated with the input data, which may be minutes, hours, days, weeks, and/or months.

In step 212, the illustrative program engine 104 converts the verified input data into a uniform secure data state. In some embodiments, the illustrative program engine 104 may convert the verified input data into the uniform secure data state based on the established baseline associated with the pattern of behavior. The illustrative program engine 104 may convert the verified input data into the uniform secure data state by modifying the representation of the input data from a physical form to a digital form that is allows for optimal exchange of a plurality of types of data. In some embodiments, the exemplary processing module 118 may convert the verified input data into the uniform secure data state based on the established baseline associated with the pattern of behavior.

In step 214, the illustrative program engine 104 dynamically enables a communication session between at least two security modules 124. In some embodiments, the illustrative program engine 104 may dynamically enable the communication session between the at least two security modules 124 of the plurality of security modules 124, where each security module 124 is associated with at least one entity of a plurality of entities. In certain embodiments, each security module 124 maintains a dynamic bus architecture that optimizes a communication between at least two security modules 124 in real-time. The communication between the two security modules 124 may refer to a transfer of a data packet associated with the verified input data from a first security module to a second security module. The data packet may refer to a particular transaction the trained machine learning module 120 identifies as exceeding a predetermined threshold of value associated with the particular data type. In some embodiments, the exemplary processing module 118 may dynamically enable the communication session between the at least two security modules of the plurality of security modules.

In step 216, the illustrative program engine 104 orchestrates a delay within the communication session. In some embodiments, the illustrative program engine 104 orchestrates a delay within the communication session based on a plurality of thresholds associated with a transfer of the data packet between the first security module and the second security module. The plurality of thresholds may refer to at least one threshold associated with each type of data and at least one threshold associated with the respective value of each type of data. The delay may refer to a planned lapse in time to capitalize on the value of the particular type of data exceeding the predetermined threshold of value based on the established baseline and the pattern of behavior associated with the particular type of data via the trained machine learning module 120.

In step 218, the illustrative program engine 104 automatically programs a plurality of controls to modify the communication session. In some embodiments, the illustrative program engine 104 may automatically program the plurality of controls to modify the communication session based on the delay in relation to the predetermined thresholds. The plurality of controls may control the delay within the communication session, a time-activated transaction associated with the predetermined thresholds of the value of the particular type of data. In some embodiments, each control may control a different aspect of the communication session. In some embodiments, the exemplary processing module 118 may automatically program the plurality of controls to modify the communication session based on the delay.

In certain embodiments, the illustrative program engine 104 may generate a notification detailing the conversion to the uniform secure data state via a GUI housed on the computing device 102. In certain embodiments, the illustrative program engine 104 may utilize a service works engine (not shown) to generate the notification detailing the conversion. In some embodiments, the illustrative program engine 104 may instruct subsequent transactions based on the conversion to the uniform secure data state, where the transaction may be an additional exchange of a type of data into another type of data. In some embodiments, the illustrative program engine 104 may utilize a rules engine (not shown) to collect market input to modify the converted input data to match market output data based on the established baseline associated with the output of the previous transaction. In some embodiments, the illustrative program engine 104 may generate a printed notification detailing a modified input data based on the market output data.

Figure 3:
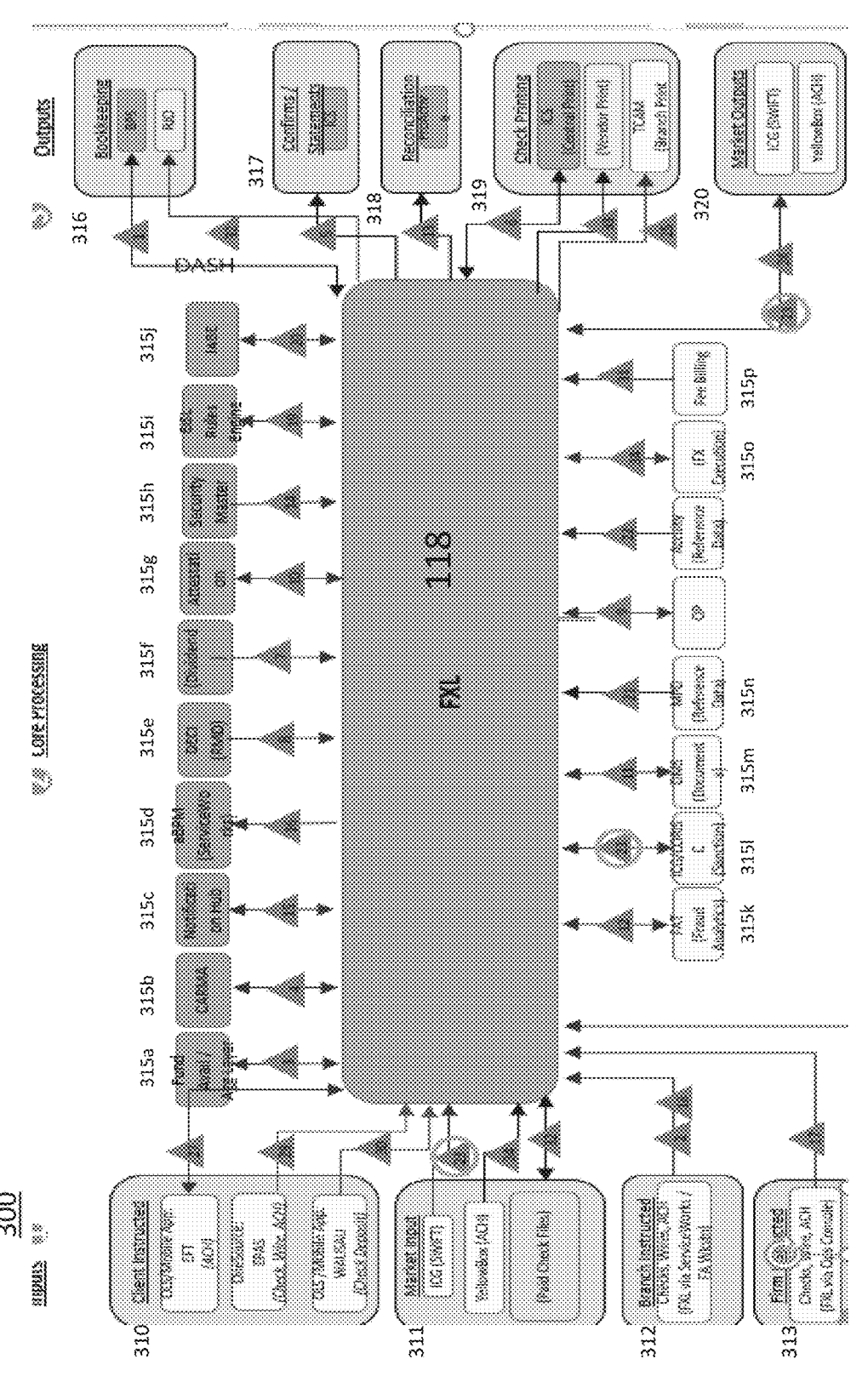
FIG. 3 is a diagram illustrating a processing module associated with the exemplary computer-based system and platform, in accordance with one or more embodiments of the present disclosure.

FIG. 3 is a diagram 300 illustrating a processing module associated with the exemplary computer-based system and platform, in accordance with one or more embodiments of the present disclosure.

In FIG. 3, the exemplary processing module 118 may collect market input to modify data in a way that algins the modified data with market output data while maintaining a branch instructed, a client instructed, and/or a firm instructed preference associated with any previous output data via a bookkeeping record of previous transactions. In certain embodiments, the bookkeeping record of previous transactions may be stored in the server 106 and may be accessed by the trained machine learning module 120 to establish the baseline for the particular data type and/or instruct the plurality of controls to modify the communication session based on the delay. In some embodiments, the exemplary processing module 118 may include a plurality of data layers capable of communication with internal data sources and external data sources, where the internal sources may refer to the trained machine learning module 120 and the external sources may refer to the plurality of security modules 124 associated with the communication session. In certain embodiments, the verified input data may refer to multiple inputs, such as client instructed inputs 310, market inputs 311; branch instructed inputs 312, and/or firm instructed inputs 313. The client instructed inputs 310 may include a plurality of client portals and/or a plurality of mobile applications, such as EFT. The market inputs 311 may include a plurality of client selected vendors, such as currencies exchanged on the foreign exchange market. The branch instructed input 312 may include checks, wires, ACH, foreign currencies via the exemplary processing module 118. The firm instructed inputs 313 may include checks, wires, ACH, foreign currencies via the plurality of security modules 124.

In certain embodiments, the exemplary processing module 118 may refer to a multi-layered processing module with a plurality of data feedback loops capable of determining input data associated with the instructions to perform the action, where the exemplary processing module 118 may include the following layers: a fund available layer 315a, a Client/Account/Relationship Master ("CARMA") layer 315b, a Notification Hub layer 315c, a ServiceWorks layer 315d, a data exchange and collaboration infrastructure ("DECI") layer 315e, a dividend layer 315f, an attestation layer 315g, a Security Master layer 315h, a rules engine layer 315i, a joint account balance estimator ("JABE") 315j, a fraud analytics layer 315k, a sanction layer 315l, a documents layer 315m, a reference data layer 315n, a foreign exchange execution layer 315o, and a fee billing layer 315p.

In some embodiments, the exemplary processing module 118 may utilize the plurality of layers to generate multiple outputs including, a communication session, a plurality of thresholds related to the multiple inputs, a plurality of instructions to perform actions related to the plurality of controls 126, a bookkeeping output 316, a statement output 317, a reconciliation output 318, a check printing output 319, and a market output 320. In some embodiments, the bookkeeping output 316 may include BPS and RIO of the previous transactions stored within the server 106. In some embodiments, the statement output 317 may include the plurality of instructions to perform subsequent actions. In some embodiments, the reconciliation output 318 may include the established baseline, the pattern of behavior associated with each type of data, and the plurality of thresholds associated with the trained machine learning module 120. In some embodiments, the check printing output 319 may include central print data, vendor print data, and branch print data. In some embodiments, the market output 320 may include predictive data associated with the particular type of data based on the plurality of thresholds of the trained machine learning module 120.

Figure 4:
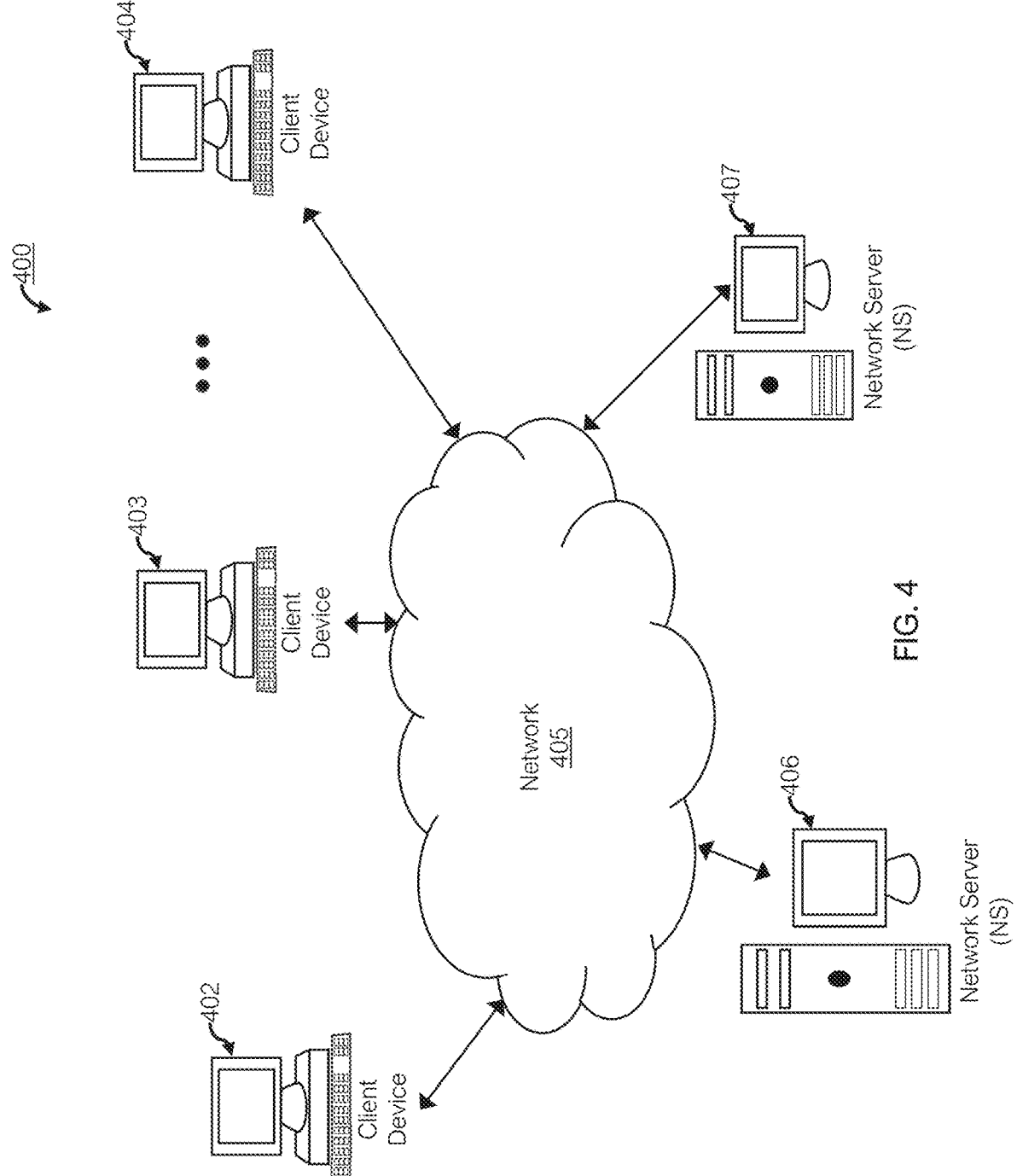
FIG. 4 depicts a block diagram of exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to utilize the exemplary processing module 118 to dynamically enable a communication session between at least two security modules 124; orchestrate a delay within the communication session based on a plurality of threshold; and automatically program a plurality of controls 124 to modify the communication session, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to remotely execute the instructions associated with the exemplary processing module 118 of the present disclosure, automatically utilizing at least one machine-learning model described herein.

In some embodiments, referring to FIG. 4, members 402-404 (e.g., clients) of the exemplary computer-based system/platform 400 may include virtually any computing device capable of utilizing the exemplary processing module 118 to dynamically enable a communication session between at least two security modules 124; orchestrate a delay within the communication session based on a plurality of threshold; and automatically program a plurality of controls 124 to modify the communication session via a network (e.g., cloud network 109), such as network 405, to and from another computing device, such as servers 406 and 407, each other, and the like. In some embodiments, the member devices 402-404 may be smart phones, personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may launch one or more applications, such as Internet browsers, mobile applications, voice calls, video games, videoconferencing, and email, among others. In some embodiments, one or more member devices within member devices 402-404 may be configured to receive and to send web pages, and the like. In some embodiments, the exemplary processing module 118 of the present disclosure may be configured to collect market input to modify the converted uniform data state input data to match market output data based on the established baseline and employ virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine-readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to dynamically enable a communication session between at least two security modules 124; orchestrate a delay within the communication session based on a plurality of threshold; and automatically program a plurality of controls 124 to modify the communication session.

Figure 5:
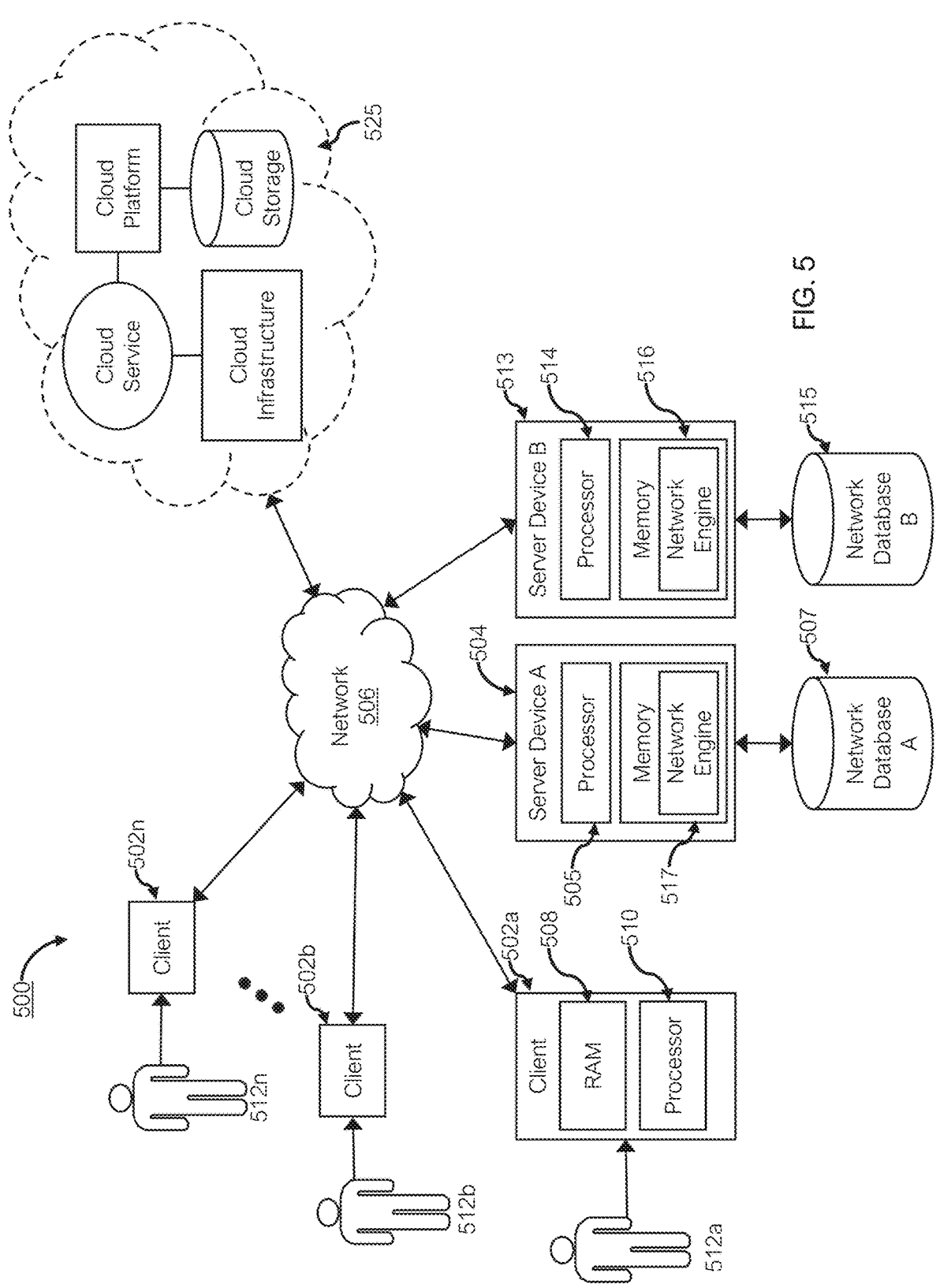
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502*a* through 502*n* may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
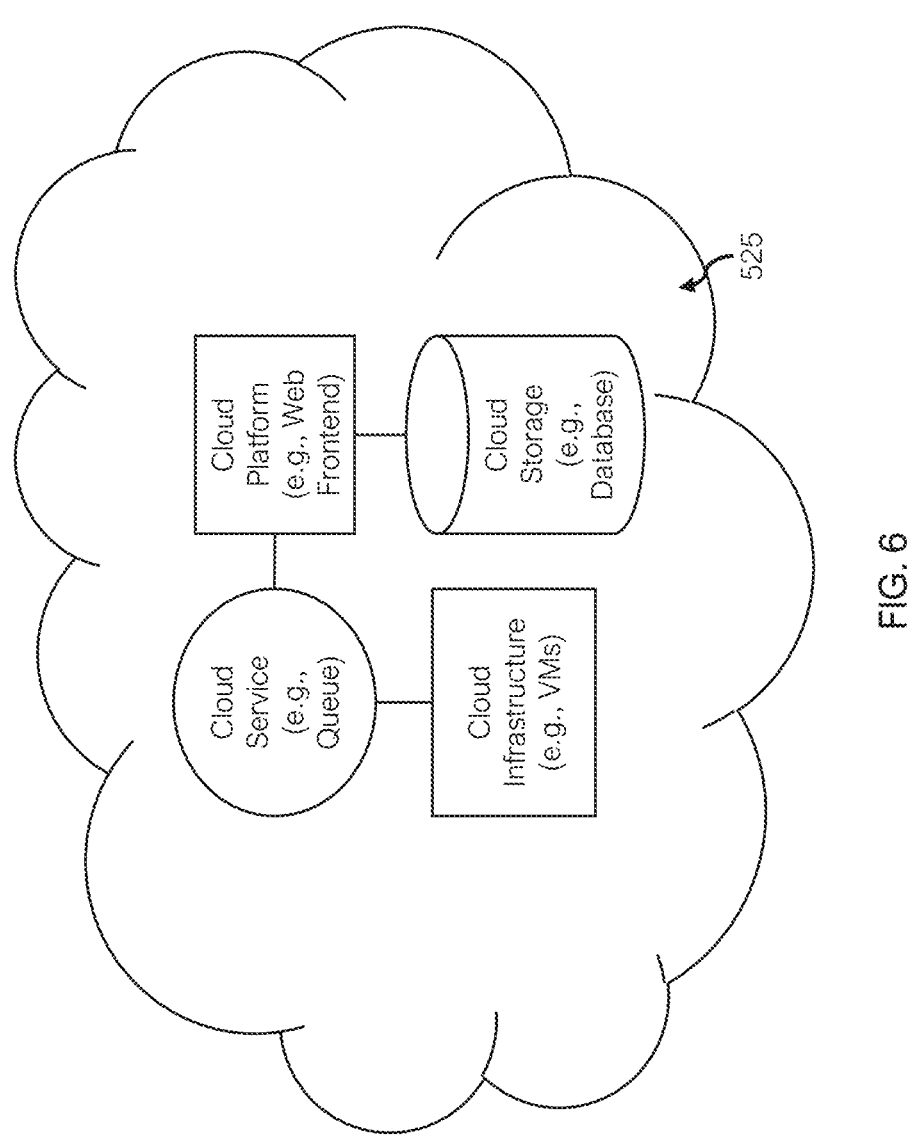
FIGS. 6 and 7 are diagrams illustrating implementations of cloud computing architecture/aspects with respect to which the disclosed technology may be specifically configured to operate, in accordance with one or more embodiments of the present disclosure.
Figure 7:
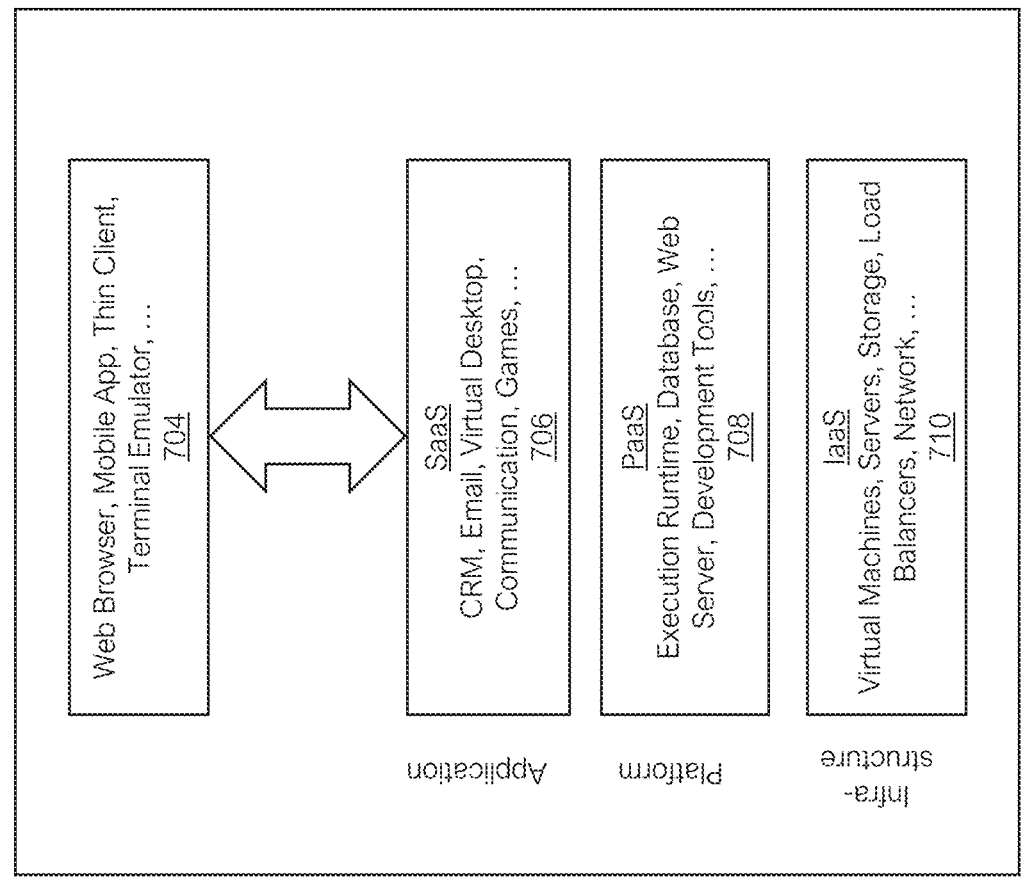

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in a cloud computing/architecture such as, but not limiting to: infrastructure a service (IaaS) 710, platform as a service (PaaS) 708, and/or software as a service (SaaS) 706.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/ PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19)

JavaFX Mobile;™ (20) Microsoft DirectX™; (21) .NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary spam prevention module 118 of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent tests for software agents that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999, 999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary spam prevention module 118 of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

The aforementioned examples are, of course, illustrative and not restrictive.

At least some aspects of the present disclosure will now be described with reference to the following numbered clauses.

Clause 1. A method may include: accessing, by at least one processor, a set of data records associated with a computing device; receiving, by the at least one processor, an instruction to perform an action via the computing device; utilizing, by the at least one processor, a processing module to determine input data associated with the instruction to perform the action; verifying, by the at least one processor, the input data based on a previous output of a trained machine learning module; identifying, by the at least one processor and in response to verifying the input data, a pattern of behavior associated with each type of data over a predetermined period of time; converting, by the at least one processor, verified input data of a particular data type into a uniform secure data state based on an established baseline associated with the pattern of behavior; dynamically enabling, by the at least one processor, a communication session between at least two security modules of a plurality of security modules associated with a plurality of entities based on a dynamic bus architecture associated with each security module; orchestrating, by the at least one processor, a delay within the communication session based on a plurality of thresholds associated with the trained machine learning module; and automatically programming, by the at least one processor, a plurality of controls to modify the communication session based on the delay in relation to the trained machine learning module.

Clause 2. The method according to clause 1, where the processing module includes determining a plurality of types of data and respective values in real-time for each type of data.

Clause 3. The method according to clause 1 or 2, where a first security module of the plurality of security modules transmits a data packet associated with the uniform secure data state to a second security module of the plurality of security modules.

Clause 4. The method according to clause 1, 2 or 3, where the plurality of controls include at least one control associated with a time of the type of data and at least one control associated with a value of the type of data.

Clause 5. The method according to clause 1, 2, 3 or 4, where the plurality of thresholds are based on the respective type and value of data associated with the input data.

Clause 6. The method according to clause 1, 2, 3, 4 or 5, further including: generating, by the at least one processor, a notification detailing a conversion displayed via a graphic user interface housed on the computing device associated with the user; utilizing, by the at least one processor, an operations console device to instruct subsequent transactions based on the conversion of the verified input data; receiving, by the at least one processor, a second instruction via the computing device; utilizing, by the at least one processor, a rules engine to collect market input to modify the converted input data to match market output data based on an established baseline associated with the output of the previous transaction; and generating, by the at least one processor, a printed notification detailed modified input data based on the market output data.

Clause 7. The method according to clause 1, 2, 3, 4, 5 or 6, where a service works engine generates the notification detailing the conversion.

Clause 8. A non-transitory computer-readable storage medium tangibly encoded with computer-executable instructions, that when executed by a device, perform a method including: accessing, by at least one processor, a set of data records associated with a computing device; receiving, by the at least one processor, an instruction to perform an action via the computing device; utilizing, by the at least one processor, a processing module to determine input data associated with the instruction to perform the action; verifying, by the at least one processor, the input data based on a previous output of a trained machine learning module; identifying, by the at least one processor and in response to verifying the input data, a pattern of behavior associated with each type of data over a predetermined period of time; converting, by the at least one processor, verified input data of a particular data type into a uniform secure data state based on an established baseline associated with the pattern of behavior; dynamically enabling, by the at least one processor, a communication session between at least two security modules of a plurality of security modules associated with a plurality of entities based on a dynamic bus architecture associated with each security module; orchestrating, by the at least one processor, a delay within the communication session based on a plurality of thresholds associated with the trained machine learning module; and automatically programming, by the at least one processor, a plurality of controls to modify the communication session based on the delay in relation to the trained machine learning module.

Clause 9. The non-transitory computer-readable storage medium according to clause 8, where the processing module includes determining a plurality of types of data and respective values in real-time for each type of data.

Clause 10. The non-transitory computer-readable storage medium according to clause 8 or 9, where a first security module of the plurality of security modules transmits a data packet associated with the uniform secure data state to a second security module of the plurality of security modules.

Clause 11. The non-transitory computer-readable storage medium according to clause 8, 9 or 10, where the plurality of controls include at least one control associated with a time of the type of data and at least one control associated with a value of the type of data.

Clause 12. The non-transitory computer-readable storage medium according to clause 8, 9, 10 or 11, where the plurality of thresholds are based on the respective type and value of data associated with the input data.

Clause 13. The non-transitory computer-readable storage medium according to clause 8, 9, 10, 11 or 12, further including: generating, by the at least one processor, a notification detailing a conversion displayed via a graphic user interface housed on the computing device associated with the user; utilizing, by the at least one processor, an operations console device to instruct subsequent transactions based on the conversion of the verified input data; receiving, by the at least one processor, a second instruction via the computing device; utilizing, by the at least one processor, a rules engine to collect market input to modify the converted input data to match market output data based on an established baseline associated with the output of the previous transaction; and generating, by the at least one processor, a printed notification detailed modified input data based on the market output data.

Clause 14. The non-transitory computer-readable storage medium according to clause 8, 9, 10, 11, 12 or 13, where a service works engine generates the notification detailing the conversion.

Clause 15. A system including: a non-transient computer memory, storing software instructions; at least one processor of a computing device associated with a user; where, when the at least one processor executes the software instructions, the computing device is programmed to: access a set of data records associated with the computing device; receive an instruction to perform an action via the computing device; utilize a processing module to determine input data associated with the instruction to perform the action; verify the input data based on a previous output of a trained machine learning module; identify, in response to verifying the input data, a pattern of behavior associated with each type of data over a predetermined period of time; convert verified input data of a particular data type into a uniform secure data state based on an established baseline associated with the pattern of behavior; dynamically enable a communication session between at least two security modules of a plurality of security modules associated with a plurality of entities based on a dynamic bus architecture associated with each security module; orchestrate a delay within the communication session based on a plurality of thresholds associated with the trained machine learning module; and automatically program a plurality of controls to modify the communication session based on the delay in relation to the trained machine learning module.

Clause 16. The system of claim 15, where the processing module includes determining a plurality of types of data and respective values in real-time for each type of data.

Clause 17. The system of claim 15 or 16, where a first security module of the plurality of security modules transmits a data packet associated with the uniform secure data state to a second security module of the plurality of security modules.

Clause 18. The system of claim 15, 16 or 17, where the plurality of controls include at least one control associated with a time of the type of data and at least one control associated with a value of the type of data.

Clause 19. The system of claim 15, 16, 17 or 18, where the plurality of thresholds are based on the respective type and value of data associated with the input data.

Clause 20. The system of claim 15, 16, 17, 18 or 19, where the software instructions further include: generate a notification detailing a conversion displayed via a graphic user interface housed on the computing device associated with the user; utilize an operations console device to instruct subsequent transactions based on the conversion of the verified input data; receive a second instruction via the computing device; utilize a rules engine to collect market input to modify the converted input data to match market output data based on an established baseline associated with the output of the previous transaction; and generate a printed notification detailed modified input data based on the market output data.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

What is claimed is:

1. A computer implemented method comprising:
   accessing, by at least one processor, a set of data records associated with a computing device;
   receiving, by the at least one processor, an instruction to perform an action via the computing device;
   utilizing, by the at least one processor, a processing module to determine input data associated with the instruction to perform the action;
   identifying, by the at least one processor and in response to verifying the input data, via a trained machine learning module, a pattern of behavior associated with each type of data over a predetermined period of time;
   converting, by the at least one processor, the input data of a particular data type into a uniform secure data state based on an established baseline associated with the pattern of behavior to form a converted input data;
   dynamically modifying, by the at least one processor, the converted input data to match output data based on the established baseline associated with the pattern of behavior via a rules engine to form a modified input data;
   dynamically enabling, by the at least one processor, a communication session between at least two security modules of a plurality of security modules associated with a plurality of entities based on a dynamic bus architecture associated with each security module;
   orchestrating, by the at least one processor, a delay within the communication session between the at least two security modules based on the modified input data and a plurality of thresholds associated with the pattern of behavior associated with each type of data, the delay comprising at least one pause in transmissions of the communication session for a period of time in which the modified input data meets at least one predetermined threshold of the plurality of thresholds based at least in part on the pattern of behavior of each type of data;
   automatically programming, by the at least one processor, a plurality of controls to modify the communication sessions based on the delay associated with the at least one predetermined threshold,
      wherein the plurality of controls comprise at least one control associated with a time of the type of data and at least one control associated with a value of the type of data, wherein the at least one predetermined threshold is based on a respective type of data and a respective value of data associated with the modified input data;

automatically executing, by the at least one processor, the communication session based on the delay in relation to the trained machine learning module; and displaying, by the at least one processor, the communication session between the at least two security modules via a graphical user interface housed on a computing device associated with a user.

2. The method of claim 1, wherein the processing module comprises determining a plurality of types of data and respective values in real-time for each type of data.

3. The method of claim 1, wherein a first security module of the plurality of security modules transmits a data packet associated with the uniform secure data state to a second security module of the plurality of security modules.

4. The method of claim 1, wherein the plurality of controls comprise at least one control associated with a time of the type of data and at least one control associated with a value of the type of data.

5. The method of claim 1, wherein the plurality of thresholds are based on the respective type and value of data associated with the input data.

6. The method of claim 1, further comprising:

generating, by the at least one processor, a notification detailing a conversion displayed via a graphic user interface housed on the computing device associated with the user;

utilizing, by the at least one processor, an operations console device to instruct subsequent transactions based on the conversion of the verified input data;

receiving, by the at least one processor, a second instruction via the computing device;

utilizing, by the at least one processor, a rules engine to collect market input to modify the converted input data to match market output data based on an established baseline associated with the output of the previous transaction; and generating, by the at least one processor, a printed notification detailed modified input data based on the market output data.

7. The method of claim 6, wherein a service works engine generates the notification detailing the conversion.

8. A non-transitory computer-readable storage medium tangibly encoded with computer-executable instructions, that when executed by a device, perform a method comprising:

accessing, by at least one processor, a set of data records associated with a computing device;

receiving, by the at least one processor, an instruction to perform an action via the computing device;

utilizing, by the at least one processor, a processing module to determine input data associated with the instruction to perform the action;

identifying, by the at least one processor and in response to verifying the input data, via a trained machine learning module, a pattern of behavior associated with each type of data over a predetermined period of time;

converting, by the at least one processor, the input data of a particular data type into a uniform secure data state based on an established baseline associated with the pattern of behavior to form a converted input data;

dynamically modifying, by the at least one processor, the converted input data to match output data based on the established baseline associated with the pattern of behavior via a rules engine to form a modified input data;

dynamically enabling, by the at least one processor, a communication session between at least two security modules of a plurality of security modules associated with a plurality of entities based on a dynamic bus architecture associated with each security module;

orchestrating, by the at least one processor, a delay within the communication session between the at least two security modules based on the modified input data and a plurality of thresholds associated with pattern of behavior associated with each type of data, the delay comprising at least one pause in transmissions of the communication session for a period of time in which the modified input data meets a predetermined threshold;

automatically programming, by the at least one processor, a plurality of controls to modify the communication sessions based on the delay associated with the at least one predetermined threshold;

automatically executing, by the at least one processor, the communication session based on the delay in relation to the trained machine learning module; and displaying, by the at least one processor, the communication session between the at least two security modules via a graphical user interface housed on a computing device associated with a user.

9. The non-transitory computer-readable storage medium of claim 8, wherein the processing module comprises determining a plurality of types of data and respective values in real-time for each type of data.

10. The non-transitory computer-readable storage medium of claim 8, wherein a first security module of the plurality of security modules transmits a data packet associated with the uniform secure data state to a second security module of the plurality of security modules.

11. The non-transitory computer-readable storage medium of claim 8, wherein the plurality of controls comprise at least one control associated with a time of the type of data and at least one control associated with a value of the type of data.

12. The non-transitory computer-readable storage medium of claim 8, wherein the plurality of thresholds are based on the respective type and value of data associated with the input data.

13. The non-transitory computer-readable storage medium of claim 8, further comprising:

generating, by the at least one processor, a notification detailing a conversion displayed via a graphic user interface housed on the computing device associated with the user;

utilizing, by the at least one processor, an operations console device to instruct subsequent transactions based on the conversion of the verified input data;

receiving, by the at least one processor, a second instruction via the computing device;

utilizing, by the at least one processor, a rules engine to collect market input to modify the converted input data to match market output data based on an established baseline associated with the output of the previous transaction; and generating, by the at least one processor, a printed notification detailed modified input data based on the market output data.

14. The non-transitory computer-readable storage medium of claim 13, wherein a service works engine generates the notification detailing the conversion.

15. A system comprising:

a non-transient computer memory, storing software instructions;

at least one processor of a computing device associated with a user;

wherein, when the at least one processor executes the software instructions, the computing device is programmed to:

access a set of data records associated with the computing device;

receive an instruction to perform an action via the computing device;

utilize a processing module to determine input data associated with the instruction to perform the action;

identify, in response to verifying the input data, via a trained machine learning module, a pattern of behavior associated with each type of data over a predetermined period of time;

convert the input data of a particular data type into a uniform secure data state based on an established baseline associated with the pattern of behavior to form a converted input data;

dynamically modify the converted input data to match output data based on the established baseline associated with the pattern of behavior via a rules engine to form a modified input data;

dynamically enable a communication session between at least two security modules of a plurality of security modules associated with a plurality of entities based on a dynamic bus architecture associated with each security module;

orchestrate a delay within the communication session between the at least two security modules based on the modified input data and a plurality of thresholds associated with the pattern of behavior associated with each type of data, the delay comprising at least one pause in transmissions of the communication session for a period of time in which the modified input data meets at least one predetermined threshold of the plurality of thresholds based at least in part on the pattern of behavior of each type of data;

automatically program a plurality of controls to modify the communication sessions based on the delay associated with the at least one predetermined threshold of the plurality of thresholds, wherein the plurality of controls comprise at least one control associated with a time of the type of data and at least one control associated with a value of the type of data, wherein the at least one predetermined threshold is based on a respective type of data and a respective value of data associated with the modified input data;

automatically execute the communication session based on the delay in relation to the trained machine learning module; and display the communication session between the at least two security modules via a graphical user interface housed on a computing device associated with a user.

16. The system of claim 15, wherein the processing module comprises determining a plurality of types of data and respective values in real-time for each type of data.

17. The system of claim 15, wherein a first security module of the plurality of security modules transmits a data packet associated with the uniform secure data state to a second security module of the plurality of security modules.

18. The system of claim 15, wherein the plurality of controls comprise at least one control associated with a time of the type of data and at least one control associated with a value of the type of data.

19. The system of claim 15, wherein the plurality of thresholds are based on the respective type and value of data associated with the input data.

20. The system of claim 15, wherein the software instructions further comprise:

generate a notification detailing a conversion displayed via a graphic user interface housed on the computing device associated with the user;

utilize an operations console device to instruct subsequent transactions based on the conversion of the verified input data;

receive a second instruction via the computing device;

utilize a rules engine to collect market input to modify the converted input data to match market output data based on an established baseline associated with the output of the previous transaction; and generate a printed notification detailed modified input data based on the market output data.

\* \* \* \* \*